US009989622B1

United States Patent
Griesdorf et al.

(10) Patent No.: US 9,989,622 B1
(45) Date of Patent: Jun. 5, 2018

(54) CONTROLLING RADIO STATES FOR MOTION DETECTION

(71) Applicant: Cognitive Systems Corp., Waterloo (CA)

(72) Inventors: Dustin Griesdorf, Waterloo (CA); Stephen Arnold Devison, Kitchener (CA); Christopher Vytautas Olekas, Breslau (CA)

(73) Assignee: Cognitive Systems Corp., Waterloo, ON (CA)

( * ) Notice: Subject to any disclaimer, the term of this patent is extended or adjusted under 35 U.S.C. 154(b) by 0 days. days.

(21) Appl. No.: 15/683,637

(22) Filed: Aug. 22, 2017

Related U.S. Application Data

(60) Provisional application No. 62/472,414, filed on Mar. 16, 2017.

(51) Int. Cl.
*G01S 5/02* (2010.01)
*G01S 7/34* (2006.01)
(Continued)

(52) U.S. Cl.
CPC .......... *G01S 5/0273* (2013.01); *G01S 5/0252* (2013.01); *G01S 7/34* (2013.01); *G01S 7/489* (2013.01); *G01S 13/56* (2013.01)

(58) Field of Classification Search
CPC ........ G01S 5/02; G01S 5/0252; G01S 5/0273; G01S 5/0284; G01S 5/0289; G01S 7/34;
(Continued)

(56) References Cited

U.S. PATENT DOCUMENTS

| 4,054,879 A | 10/1977 | Wright et al. |
| 4,075,573 A * | 2/1978 | Kennedy .................. G01S 7/34 |
| | | 330/129 |

(Continued)

FOREIGN PATENT DOCUMENTS

| CA | 2834522 | 5/2014 |
| CA | 2945702 | 8/2015 |

(Continued)

OTHER PUBLICATIONS

USPTO, Non-Final Office Action issued in U.S. App. No. 15/691,195 dated Nov. 15, 2017; 17 pgs.
(Continued)

*Primary Examiner* — Peter M Bythrow
(74) *Attorney, Agent, or Firm* — Henry Patent Law Firm PLLC

(57) ABSTRACT

In a general aspect, the radio state of a wireless communication device is controlled. In some aspects, a first set of motion detection signals is processed by operation of a radio subsystem of a wireless communication device in a first radio state. An amount of variation in the first set of motion detection signals is determined based on values of a parameter of the motion detection signals. A counter is updated in response to a determination that the variation is greater than a first threshold, and the radio subsystem is changed to a second radio state based on comparing the value of the counter with a second threshold. A motion detection process is executed to detect motion of an object in the space based on a second set of motion detection signals processed by operation of the radio subsystem in the second radio state.

30 Claims, 6 Drawing Sheets

(51) Int. Cl.
*G01S 7/489* (2006.01)
*G01S 13/56* (2006.01)

(58) Field of Classification Search
CPC ........ G01S 7/489; G01S 7/4918; G01S 7/529;
G01S 7/5345; G01S 13/50; G01S 13/56
See application file for complete search history.

(56) References Cited

U.S. PATENT DOCUMENTS

| | | | |
|---|---|---|---|
| 4,193,055 A * | 3/1980 | Barnum | G01S 7/529 342/28 |
| 4,225,858 A * | 9/1980 | Cole | G01S 13/56 340/554 |
| 4,286,260 A * | 8/1981 | Gershberg | G01S 13/56 340/554 |
| 4,649,388 A | 3/1987 | Atlas | |
| 4,740,045 A | 4/1988 | Goodson et al. | |
| 4,870,663 A * | 9/1989 | Kulju | G01S 13/56 340/554 |
| 5,270,720 A | 12/1993 | Stove | |
| 5,519,400 A * | 5/1996 | McEwan | A61B 5/0507 342/28 |
| 5,696,514 A | 12/1997 | Nathanson et al. | |
| 6,075,797 A | 6/2000 | Thomas | |
| 6,493,380 B1 | 12/2002 | Wu et al. | |
| 6,573,861 B1 | 6/2003 | Hommel et al. | |
| 7,047,015 B2 | 5/2006 | Hawe | |
| 7,295,109 B2 | 11/2007 | Kobayashi | |
| 7,317,419 B2 | 1/2008 | Sugar et al. | |
| 7,652,617 B2 | 1/2010 | Kurtz et al. | |
| 7,916,066 B1 | 3/2011 | Osterweil | |
| 8,138,918 B2 | 3/2012 | Habib | |
| 8,331,498 B2 | 12/2012 | Huang et al. | |
| 8,477,750 B2 | 7/2013 | Agarwal et al. | |
| 8,710,984 B2 | 4/2014 | Wilson et al. | |
| 8,818,288 B2 | 8/2014 | Patwari et al. | |
| 8,836,344 B2 | 9/2014 | Habib et al. | |
| 9,030,321 B2 | 5/2015 | Breed | |
| 9,143,413 B1 | 9/2015 | Manku et al. | |
| 9,143,968 B1 | 9/2015 | Manku et al. | |
| 9,523,760 B1 | 12/2016 | Kravets et al. | |
| 9,524,628 B1 | 12/2016 | Omer et al. | |
| 9,551,784 B2 | 1/2017 | Katuri | |
| 9,584,974 B1 | 2/2017 | Omer et al. | |
| 9,743,294 B1 | 8/2017 | Omer et al. | |
| 2003/0007473 A1* | 1/2003 | Strong | G01S 5/02 370/338 |
| 2003/0108119 A1 | 6/2003 | Mohebbi et al. | |
| 2005/0055568 A1 | 3/2005 | Agrawala et al. | |
| 2005/0083199 A1 | 4/2005 | Hall et al. | |
| 2006/0217132 A1 | 9/2006 | Drummond-Murray et al. | |
| 2007/0293232 A1 | 12/2007 | Nonaka | |
| 2008/0119130 A1 | 5/2008 | Sinha | |
| 2008/0240008 A1 | 10/2008 | Backes et al. | |
| 2008/0303655 A1 | 12/2008 | Johnson | |
| 2009/0040952 A1 | 2/2009 | Cover et al. | |
| 2009/0062696 A1 | 3/2009 | Nathan et al. | |
| 2009/0079615 A1* | 3/2009 | Wu | G01S 13/56 342/28 |
| 2009/0128302 A1* | 5/2009 | Srinivasan | G01S 5/0009 340/10.6 |
| 2009/0128360 A1* | 5/2009 | Bianchi | G01S 5/02 340/8.1 |
| 2010/0013636 A1* | 1/2010 | Wu | G01S 13/38 340/554 |
| 2010/0026490 A1 | 2/2010 | Butler et al. | |
| 2010/0103020 A1* | 4/2010 | Wu | G01S 13/4454 342/28 |
| 2010/0315284 A1 | 12/2010 | Trinza et al. | |
| 2011/0130092 A1 | 6/2011 | Yun et al. | |
| 2011/0148689 A1* | 6/2011 | Filippi | G01S 13/003 342/28 |
| 2012/0009882 A1 | 1/2012 | Patwari et al. | |
| 2012/0115512 A1 | 5/2012 | Grainger et al. | |
| 2012/0146788 A1 | 6/2012 | Wilson et al. | |
| 2012/0184296 A1 | 7/2012 | Milosiu | |
| 2012/0212366 A1 | 8/2012 | Alalusi | |
| 2013/0005280 A1* | 1/2013 | Leung | G01S 7/023 455/90.1 |
| 2013/0090151 A1* | 4/2013 | Ngai | H04W 52/0241 455/574 |
| 2013/0162459 A1 | 6/2013 | Aharony et al. | |
| 2013/0283256 A1 | 10/2013 | Proud | |
| 2014/0004874 A1 | 1/2014 | Schwartz et al. | |
| 2014/0015706 A1 | 1/2014 | Ishihara et al. | |
| 2014/0128778 A1 | 5/2014 | Chan et al. | |
| 2014/0135042 A1 | 5/2014 | Buchheim et al. | |
| 2014/0140231 A1 | 5/2014 | Haiut et al. | |
| 2014/0247179 A1* | 9/2014 | Furuskog | G01S 13/003 342/28 |
| 2014/0286380 A1 | 9/2014 | Prager et al. | |
| 2014/0301260 A1 | 10/2014 | Park et al. | |
| 2015/0043377 A1 | 2/2015 | Cholas et al. | |
| 2015/0063323 A1 | 3/2015 | Sadek et al. | |
| 2015/0078295 A1 | 3/2015 | Mandyam et al. | |
| 2015/0098377 A1 | 4/2015 | Amini et al. | |
| 2015/0189528 A1* | 7/2015 | Carbajal | H04W 24/08 370/252 |
| 2015/0195100 A1 | 7/2015 | Imes et al. | |
| 2015/0212205 A1* | 7/2015 | Shpater | G01S 13/38 342/28 |
| 2015/0245164 A1 | 8/2015 | Merrill | |
| 2015/0292879 A1* | 10/2015 | Zhou | G01S 7/529 73/631 |
| 2015/0338507 A1 | 11/2015 | Oh et al. | |
| 2016/0018508 A1 | 1/2016 | Chen et al. | |
| 2016/0183059 A1 | 6/2016 | Nagy et al. | |
| 2016/0187475 A1 | 6/2016 | Horng et al. | |
| 2016/0210838 A1 | 7/2016 | Yan et al. | |
| 2016/0241999 A1 | 8/2016 | Chin et al. | |
| 2017/0146656 A1 | 5/2017 | Belsley et al. | |
| 2017/0309146 A1 | 10/2017 | MacKenzie et al. | |
| 2017/0343658 A1 | 11/2017 | Ramirez et al. | |

FOREIGN PATENT DOCUMENTS

| | | |
|---|---|---|
| WO | 2014/021574 | 2/2014 |
| WO | 2014201574 | 12/2014 |
| WO | 2015/168700 | 11/2015 |

OTHER PUBLICATIONS

USPTO, Non-Final Office Action dated Dec. 28, 2017, in U.S. Appl. No. 15/789,761, 31 pgs.
USPTO, Non-Final Office Action received in U.S. Appl. No. 15/799,768 dated Dec. 13, 2017, 7 pgs.
Youssef, Moustafa , et al., "Challenges: Device-free Passive Localization for Wireless Environments", Mobicom 07 Proceedings of the 13th Annual ACM International Conference on Mobile Computing and Networking, Sep. 2007, 31 pgs.
USPTO; Restriction Requirement dated Jan. 23, 2018, in U.S. Appl. No. 15/706,295.
USPTO, Notice of Allowance dated Jan. 10, 2018, in U.S. Appl. No. 15/803,189, 28 pgs.
USPTO; Non-Final Office Action dated Jan. 23, 2018, in U.S. Appl. No. 15/789,815, 35 pgs.
Wei , et al., "Radio-based Device-free Activity Recognition with Radio Frequency Interference", IPSN '15 Proceedings of the 14th International Conference on Information Processing in Sensor Networks, Apr. 13-16, 2015, 12 pgs.
Zheng, et al., "Detecting Radio Frequency Interference for CSI Measurements on COTS WiFi Devices", IEEE ICC 2017, Ad-Hoc and Sensor Networking Symposium, May 2017, 6 pgs.
Canadian Intellectual Property Office, International Search Report and Written Opinion for International Application No. PCT/CA2017/050037 dated Apr. 13, 2017, 12 pages.
USPTO, Notice of Allowance issued in U.S. Appl. No. 15/461,125 dated Aug. 30, 2017, 15 pages.

(56) References Cited

OTHER PUBLICATIONS

Canadian Intellectual Property Office, International Search Report and Written Opinion issued International Application No. PCT/CA2016/051228 dated Apr. 25, 2017, 8 pages.
Canadian Intellectual Property Office, International Search Report and Written Opinion issued in International Application No. PCT/CA2016/051466 dated Mar. 14, 2017, 9 pages.
Apple Insider; "Intel to reportedly supply LTD chips for 2016 iPhone"; http://appleinsider.com/articles/15/03/11/intel-to-reportedly-supply-ltd-chips-for-2016-iphone; 2 pages; May 15, 2016.
CEVA; "CEVA's DSP Cores Power the World's Leading Mobile Broadband and M2M Applications"; http://www.ceva-dsp.com/Mobile-Broadband; 3 pages; May 15, 2016.
Japan Radio Co., Ltd; "26GHz FWA—Technology"; http://www.jrc.co.jp/eng/product/lneup/26ghz_wireless_ip_access_system/tech.html; 3 pages; May 15, 2016.
USPTO, Non-Final Office Action received in U.S. Appl. No. 15/099,833, dated Jun. 27, 2016, 16 pages.
USPTO, Non-Final Office Action received in U.S. Appl. No. 15/151,571, dated Aug. 5, 2016, 18 pages.
USPTO, Notice of Allowance received in U.S. Appl. No. 15/099,833, dated Oct. 14, 2016, 8 pages.
USPTO, Notice of Allowance received in U.S. Appl. No. 15/151,571, dated Jan. 10, 2017, 9 pages.
USPTO, Notice of Allowance received in U.S. Appl. No. 15/228,418, dated Oct. 12, 2016, 9 pages.
Quora.com; "What is the function of the baseband processor in wireless devices?"; https://ww.quora.com/What-is-the-function-of-the-baesband-processor-in-wireless-devices; 2 pages; May 15, 2016.
WIKIPEDIA; "Baseband processor"; rhttps://en.wikipedia.org/wiki/Bandband_processor; 2 pages; version dated Apr. 20, 2016.
Canadian Intellectual Property Office, "International Search Report and Written Opinion", in International Application No. PCT/CA2016/051229, dated Jan. 17, 2017, 9 pages.
NETGEAR, "N600 Wifi Cable Modem Router, Model C3700 User Manual", https://web.archive.org/web/20150121182848/http://www.downloads.netgear.com/files/GDC/C3700_UM_21Aug2014.pdf (archive of URL http://www.downloads.netgear.com/files/GDC/C3700_UM_21Aug2014.pdf captured on Jan. 21, 2015, 101 pages.
OPENWRT, "Wireless Configuration", https://web.archive.org/web/20140402033233/http://wiki.openwrt.org/doc/uci/wireless (capture of URL http://wiki.openwrt.org/doc/uci/wireless on Apr. 2, 2014), 22 pages.
USPTO, Final Office Action received in U.S. Appl. No. 15/176,489 dated Jun. 23, 2017, 23 pages.
USPTO, Notice of Allowance issued in U.S. Appl. No. 15/460,643 dated Jun. 12, 2017, 34 pages.
USPTO, Non-final Office Action issued in U.S. Appl. No. 15/461,125 dated Apr. 19, 2017, 56 pages.
USPTO, "Non-final Office Action", issued in U.S. Appl. No. 15/176,489 dated Mar. 22, 2017, 41 pages.
USPTO, Notice of Allowance dated Jan. 29, 2018, in U.S. Appl. No. 15/461,125, 16 pgs.
USPTO, Non-Final Office Action dated Feb. 7, 2018, in U.S. Appl. No. 15/176,489, 30 pgs.
USPTO, Non-Final Office Action dated Jan. 26, 2018, in U.S. Appl. No. 15/815,199, 36 pgs.
CIPO, International Search Report and Written Opinion dated Jan. 26, 2018, in PCT/CA2017/051290, 9 pgs.

\* cited by examiner

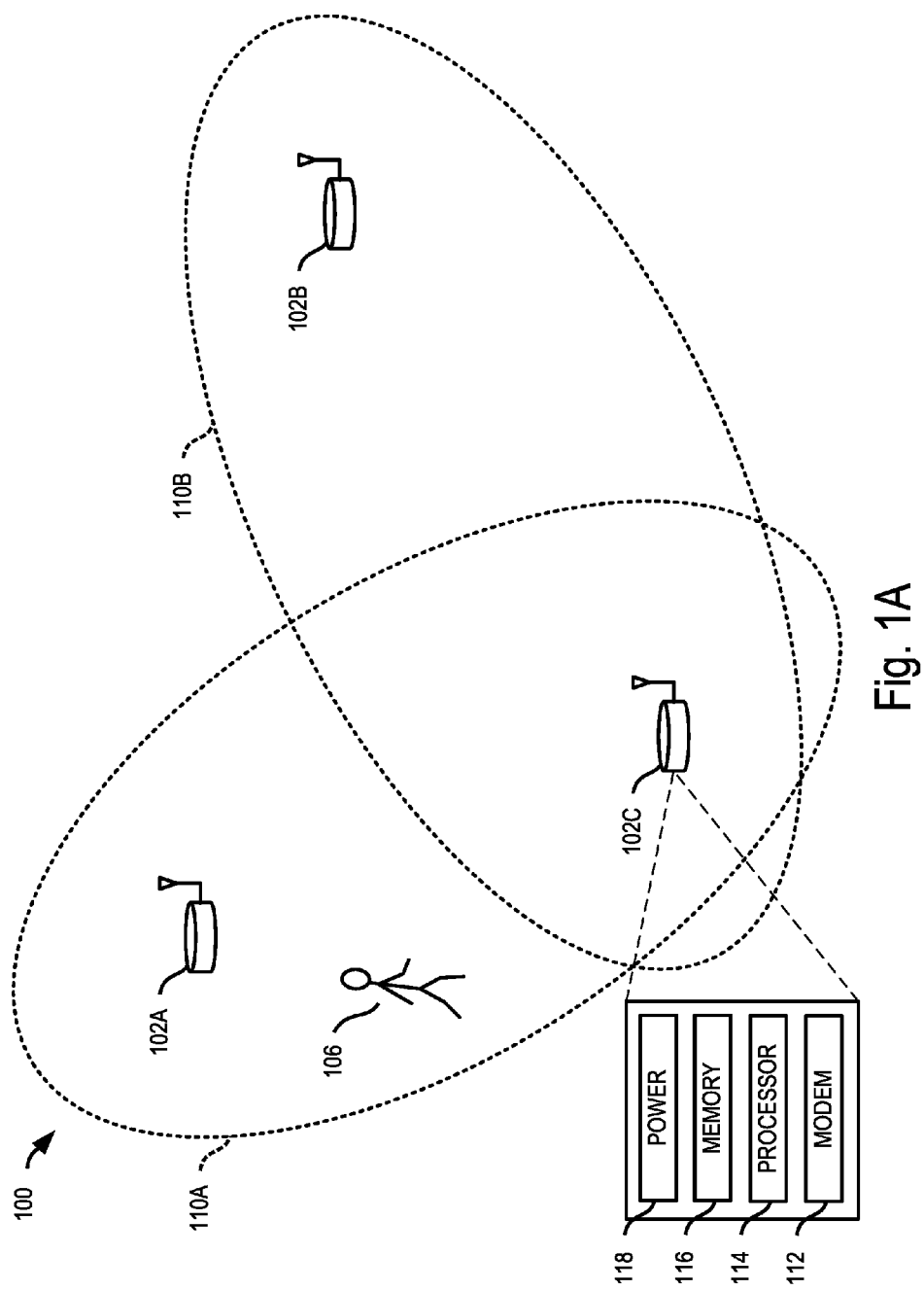

CONTROLLING RADIO STATES FOR MOTION DETECTION

CROSS-REFERENCE TO RELATED APPLICATIONS

This application claim priority to U.S. Provisional Application No. 62/472,414, filed Mar. 16, 2017 and entitled "Controlling Modem Parameters for Motion Detection," which is hereby incorporated by reference.

BACKGROUND

The following description relates to motion detection.

Motion detection systems have been used to detect movement, for example, of objects in a room or an outdoor area. In some example motion detection systems, infrared or optical sensors are used to detect movement of objects in the sensor's field of view. Motion detection systems have been used in security systems, automated control systems and other types of systems.

DESCRIPTION OF DRAWINGS

FIG. 1A is a diagram showing an example wireless communication system.

DETAILED DESCRIPTION

Figure 1B:
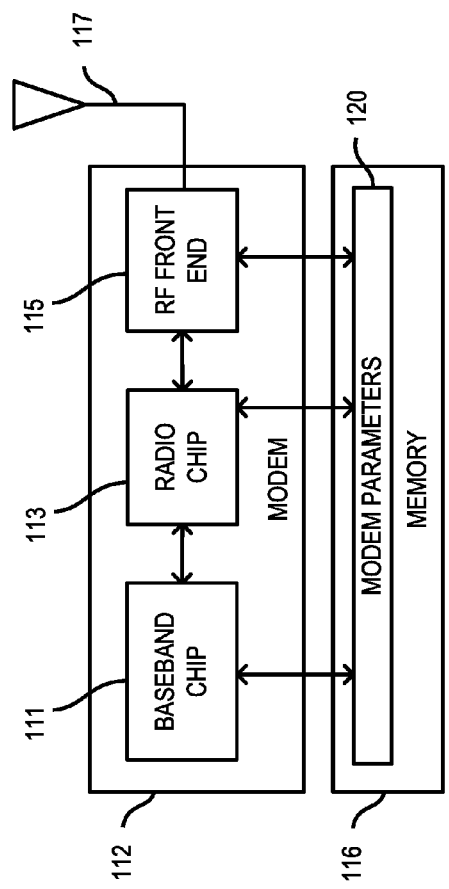
FIG. 1B is a diagram showing an example modem of a motion detector device.

In some aspects of what is described here, a radio state of a wireless communication device is controlled for motion detection. For instance, in some implementations, one or more modem parameters (e.g., a gain setting) of the wireless communication device may be controlled (e.g., held constant or allowed to change) such that wireless signals received by the wireless communication device are optimally processed to detect motion, while avoiding inefficiencies. Wireless signals (e.g., radio frequency (RF) signals) may be susceptible to constructive or destructive interference, which can cause fluctuations in the power level of signals received at the wireless communication device. In some instances, an automatic gain control (AGC) loop can be used to adjust a gain setting to account for the changes in the received wireless signal. However, when an object moves in a space, the motion may cause fluctuations in the wireless signals too. Varying the radio state of a wireless communication device can cause errors (e.g., false positives) in the detection of the motion of the object by the device, since received signals may not be directly comparable with one another. As an example, a different gain setting in a radio subsystem may cause a false positive reading by falsely indicating (because of the different gain setting) an increased power level of a new received signal relative to previously-received signals. To address these and possibly other issues in detecting motion using received wireless signals, it may be beneficial to control the radio state of the wireless communication device and, in some instances, limit changes in the gain setting or other modem parameters.

In some implementations, the radio state of a wireless communication device may be controlled based on an amount of variation (e.g., variance, standard deviation or other statistical parameter) in received signals. If it is determined that the variance is due to interference, then the wireless communication device may allow a change in its radio state. For example, the wireless communication device may allow an AGC loop to determine whether to modify a gain setting in the modem. However, if it is determined that the variation is due to motion of an object, then the wireless communication device may hold its radio state steady (e.g., hold a modem parameter, such as gain, constant).

In some instances, a "variance check counter" may be used to determine whether the variation in the received signal is caused by interference or motion. For example, in some implementations, a magnitude of a received signal is determined (e.g., the power of the signal is measured) and stored in a database. A variance (or other indicator of variation) is then computed for one or more parameters (e.g., a power level) of the signals in the database. If the variance is above a certain threshold, then the variance check counter is updated (e.g., incremented, decremented, or otherwise modified). Based on a comparison of the counter with a threshold (e.g., when the counter exceeds a threshold value), it may be determined that the variance in the received signals is due to interference, and the radio state of the wireless communication device may be allowed to change. For example, a gain state machine (e.g., an AGC loop) of the wireless communication device can determine whether a gain setting should be adjusted. If the counter has not exceeded the threshold, then the received signals may be used in a motion detection process to detect whether motion has occurred in the space traversed by the wireless signals.

In some implementations, a "motion hold" control may be used with the variance check counter described above. For example, the variance check counter may be reset to a default value (e.g., zero) when motion is detected in the space to avoid allowing the radio state (e.g., modem parameters such as a gain setting) to change while motion is occurring in the space. The motion hold control may thus allow the wireless communication device to avoid issues such as false positives or false negatives when detecting motion.

In some implementations, a motion detection process may include quality criterion for received signals, and the wireless communication device may accept or reject received signals for use as inputs to the motion detection process based on the quality criterion. For example, if a value of a signal quality metric for a received signal does not meet a threshold value, the received signal may be discarded and not used in the motion detection process. In these instances, only "accepted" packets may be analyzed for radio state control. Furthermore, in some instances, an additional counter (a "quality check counter") that monitors the number of "rejected" packets (e.g., those with high distortion or a low signal quality metric value) is used, with the counter being updated (e.g., incremented, decremented, or otherwise modified) when a packet is rejected. Based on a comparison of the counter with another threshold (e.g., when the quality check counter exceeds a threshold value), then it may be determined that one or more aspects of the radio state should be allowed to change (e.g., to provide better quality signals). Thus, in some instances, a gain setting may be allowed to change in response to the quality check counter exceeding its threshold.

The systems and techniques described here may provide one or more advantages in some instances. For example, motion of an object may be detected based on wireless signals (e.g., radio frequency (RF) signals) received by a wireless communication device. By controlling modem parameters of the wireless communication device as described herein, motion of the object may be detected with more efficiency, better accuracy, or other advantages.

FIG. 1A is a diagram showing an example wireless communication system 100. The example wireless communication system 100 includes three wireless devices—a first wireless communication device 102A, a second wireless communication device 102B, and a third wireless communication device 102C. The example wireless communication system 100 may include additional wireless communication devices and other components (e.g., additional wireless devices, one or more network servers, network routers, network switches, cables, or other communication links, etc.).

The example wireless communication devices 102A, 102B, 102C can operate in a wireless network, for example, according to a wireless network standard or another type of wireless communication protocol. For example, the wireless network may be configured to operate as a Wireless Local Area Network (WLAN), a Personal Area Network (PAN), a metropolitan area network (MAN), or another type of wireless network. Examples of WLANs include networks configured to operate according to one or more of the 802.11 family of standards developed by IEEE (e.g., Wi-Fi networks), and others. Examples of PANs include networks that operate according to short-range communication standards (e.g., BLUETOOTH®, Near Field Communication (NFC), ZigBee), millimeter wave communications, and others.

In some implementations, the wireless communication devices 102A, 102B, 102C may be configured to communicate in a cellular network, for example, according to a cellular network standard. Examples of cellular networks include networks configured according to 2G standards such as Global System for Mobile (GSM) and Enhanced Data rates for GSM Evolution (EDGE) or EGPRS; 3G standards such as Code Division Multiple Access (CDMA), Wideband Code Division Multiple Access (WCDMA), Universal Mobile Telecommunications System (UMTS), and Time Division Synchronous Code Division Multiple Access (TD-SCDMA); 4G standards such as Long-Term Evolution (LTE) and LTE-Advanced (LTE-A); and others.

In some cases, the wireless communication devices 102A, 102B, 102C can be, or they may include, standard wireless network components; for example, a conventional Wi-Fi access point or another type of wireless access point (WAP) may be used in some cases. In some cases, another type of standard or conventional Wi-Fi transmitter device may be used. The wireless communication devices 102A, 102B, 102C may be implemented without Wi-Fi components; for example, other types of standard or non-standard wireless communication may be used for motion detection. In some cases, the wireless communication devices 102A, 102B, 102C can be, or they may be part of, a dedicated motion detection system.

As shown in FIG. 1A, the example wireless communication device 102C includes a modem 112, a processor 114, a memory 116, and a power unit 118; any of the wireless communication devices 102A, 102B, 102C in the wireless communication system 100 may include the same, additional or different components, and the components may be configured to operate as shown in FIG. 1A or in another manner. In some implementations, the modem 112, processor 114, memory 116, and power unit 118 of a wireless communication device are housed together in a common housing or other assembly. In some implementations, one or more of the components of a wireless communication device can be housed separately, for example, in a separate housing or other assembly.

The example modem 112 can communicate (receive, transmit, or both) wireless signals. For example, the modem 112 may be configured to communicate radio frequency (RF) signals formatted according to a wireless communication standard (e.g., Wi-Fi). The modem 112 may be implemented as the example wireless network modem 112 shown in FIG. 1B, or may be implemented in another manner, for example, with other types of components or subsystems. In some implementations, the example modem 112 includes a radio subsystem and a baseband subsystem. In some cases, the baseband subsystem and radio subsystem can be implemented on a common chip or chipset, or they may be implemented in a card or another type of assembled device. The baseband subsystem can be coupled to the radio subsystem, for example, by leads, pins, wires, or other types of connections.

In some cases, a radio subsystem in the modem 112 can include one or more antennas and radio frequency circuitry. The radio frequency circuitry can include, for example, circuitry that filters, amplifies or otherwise conditions analog signals, circuitry that up-converts baseband signals to RF signals, circuitry that down-converts RF signals to baseband signals, etc. Such circuitry may include, for example, filters, amplifiers, mixers, a local oscillator, etc. The radio subsystem can be configured to communicate radio frequency wireless signals on the wireless communication channels. As an example, the radio subsystem may include the radio chip 113, the RF front end 115, and antenna 117 shown in FIG. 1B. A radio subsystem may include additional or different components. In some implementations, the radio subsystem can be or include the radio electronics (e.g., RF front end, radio chip, or analogous components) from a conventional modem, for example, from a Wi-Fi modem, pico base station modem, etc. In some implementations, the antenna 117 includes multiple antennas.

In some cases, a baseband subsystem in the modem 112 can include, for example, digital electronics configured to process digital baseband data. As an example, the baseband subsystem may include the baseband chip 111 shown in FIG. 1B. A baseband subsystem may include additional or different components. In some cases, the baseband subsystem may include a digital signal processor (DSP) device or another type of processor device. In some cases, the baseband system includes digital processing logic to operate the radio subsystem, to communicate wireless network traffic through the radio subsystem, to detect motion based on motion detection signals received through the radio subsystem or to perform other types of processes. For instance, the baseband subsystem may include one or more chips, chipsets, or other types of devices that are configured to encode signals and deliver the encoded signals to the radio subsystem for transmission, or to identify and analyze data encoded in signals from the radio subsystem (e.g., by decoding the signals according to a wireless communication standard, by processing the signals according to a motion detection process, or otherwise).

In some instances, the radio subsystem in the example modem 112 receives baseband signals from the baseband subsystem, up-converts the baseband signals to radio frequency (RF) signals, and wirelessly transmits the radio frequency signals (e.g., through an antenna). In some instances, the radio subsystem in the example modem 112 wirelessly receives radio frequency signals (e.g., through an antenna), down-converts the radio frequency signals to baseband signals, and sends the baseband signals to the baseband subsystem. The signals exchanged between the radio subsystem and the baseband subsystem may be digital or analog signals. In some examples, the baseband subsystem includes conversion circuitry (e.g., a digital-to-analog converter, an analog-to-digital converter) and exchanges analog signals with the radio subsystem. In some examples, the radio subsystem includes conversion circuitry (e.g., a digital-to-analog converter, an analog-to-digital converter) and exchanges digital signals with the baseband subsystem.

In some cases, the baseband subsystem of the example modem 112 can communicate wireless network traffic (e.g., data packets) in the wireless communication network through the radio subsystem on one or more network traffic channels. The baseband subsystem of the modem 112 may also transmit or receive (or both) signals (e.g., motion probe signals or motion detection signals) through the radio subsystem on a dedicated wireless communication channel. In some instances, the baseband subsystem generates motion probe signals for transmission, for example, in order to probe a space for motion. In some instances, the baseband subsystem processes received motion detection signals (signals based on motion probe signals transmitted through the space), for example, to detect motion of an object in a space.

The example processor 114 can execute instructions, for example, to generate output data based on data inputs. The instructions can include programs, codes, scripts, or other types of data stored in memory. Additionally or alternatively, the instructions can be encoded as pre-programmed or re-programmable logic circuits, logic gates, or other types of hardware or firmware components. The processor 114 may be or include a general purpose microprocessor, as a specialized co-processor or another type of data processing apparatus. In some cases, the processor 114 performs high level operation of the wireless communication device 102C. For example, the processor 114 may be configured to execute or interpret software, scripts, programs, functions, executables, or other instructions stored in the memory 116. In some implementations, the processor 114 may be included in the modem 112.

The example memory 116 can include computer-readable media, for example, a volatile memory device, a non-volatile memory device, or both. The memory 116 can include one or more read-only memory devices, random-access memory devices, buffer memory devices, or a combination of these and other types of memory devices. In some instances, one or more components of the memory can be integrated or otherwise associated with another component of the wireless communication device 102C. The memory 116 may store instructions that are executable by the processor 114. The instructions may include instructions for controlling the radio state of the wireless communication device (e.g., holding, modifying, or otherwise controlling one or more modem parameters), such as through process 400 of FIGS. 4A-4C.

The example power unit 118 provides power to the other components of the wireless communication device 102C. For example, the other components may operate based on electrical power provided by the power unit 118 through a voltage bus or other connection. In some implementations, the power unit 118 includes a battery or a battery system, for example, a rechargeable battery. In some implementations, the power unit 118 includes an adapter (e.g., an AC adapter) that receives an external power signal (from an external source) and coverts the external power signal to an internal power signal conditioned for a component of the wireless communication device 102C. The power unit 118 may include other components or operate in another manner.

In the example shown in FIG. 1A, the wireless communication devices 102A, 102B transmit wireless signals (e.g., according to a wireless network standard, a motion detection protocol, or otherwise). For instance, wireless communication devices 102A, 102B may broadcast wireless signals (e.g., reference signals, beacon signals, status signals, etc.), or they may send wireless signals addressed to other devices (e.g., a user equipment, a client device, a server, etc.), and the other devices (not shown) as well as the wireless communication device 102C may receive the wireless signals transmitted by the wireless communication devices 102A, 102B. In some cases, the wireless signals transmitted by the wireless communication devices 102A, 102B are repeated periodically, for example, according to a wireless communication standard or otherwise.

In the example shown, the wireless communication device 102C, operating in a state defined by modem parameters, processes the wireless signals from the wireless communication devices 102A, 102B and detects motion of an object in a space accessed by the wireless signals. For example, the wireless communication device 102C may perform the example process 400 of FIGS. 4A-4C, or another type of process for detecting motion. The space accessed by the wireless signals can be an indoor or outdoor space, which may include, for example, one or more fully or partially enclosed areas, an open area without enclosure, etc. The space can be or can include an interior of a room, multiple rooms, a building, or the like. In some cases, the wireless communication system 100 can be modified, for instance, such that the wireless communication device 102C can transmit wireless signals and the wireless communication devices 102A, 102B can processes the wireless signals from the wireless communication device 102C to detect motion.

The wireless signals used for motion detection can include, for example, a beacon signal (e.g., Bluetooth Beacons, Wi-Fi Beacons, other wireless beacon signals), another standard signal generated for other purposes according to a wireless network standard, or non-standard signals (e.g., random signals, reference signals, etc.) generated for motion detection or other purposes. In some examples, the wireless signals propagate through an object (e.g., a wall) before or after interacting with a moving object, which may allow the moving object's movement to be detected without an optical line-of-sight between the moving object and the transmission or receiving hardware. Based on the received signals, the third wireless communication device 102C may generate motion detection data. In some instances, the third wireless communication device 102C may communicate the motion detection data to another device or system, such as a security system, that may include a control center for monitoring movement within a space, such as a room, building, outdoor area, etc.

In some implementations, the wireless communication devices 102A, 102B can be modified to transmit motion probe signals (e.g., those described below with respect to FIG. 2) on a separate wireless communication channel (e.g., a frequency channel or coded channel) from wireless network traffic signals. For example, the modulation applied to the payload of a motion probe signal and the type of data or data structure in the payload may be known by the third wireless communication device 102C, which may reduce the amount of processing that the third wireless communication device 102C performs for motion sensing. The header may include additional information such as, for example, an indication of whether motion was detected by another device in the communication system 100, an indication of the modulation type, an identification of the device transmitting the signal, etc.

In the example shown in FIG. 1A, the wireless communication link between the third wireless communication device 102C and the first wireless communication device 102A can be used to probe a first motion detection field 110A, and the wireless communication link between the third wireless communication device 102C and the second wireless communication device 102A can be used to probe a second motion detection field 110B. In some instances, the third wireless communication device 102C detects motion in the motion detection fields 110A, 110B by processing received signals that are based on wireless signals transmitted by the wireless communication devices 102A, 102B, respectively. For example, when the person 106 shown in FIG. 1A moves in the first motion detection field 110A, the third wireless communication device 102C may detect the motion based on signals received at the third wireless communication device 102C that are based on wireless signals transmitted by the first wireless communication device 102A.

In some instances, the motion detection fields 110A, 110B can include, for example, air, solid materials, liquids, or another medium through which wireless electromagnetic signals may propagate. In the example shown in FIG. 1A, the first motion detection field 110A provides a wireless communication channel between the first wireless communication device 102A and the third wireless communication device 102C, and the second motion detection field 110B provides a wireless communication channel between the second wireless communication device 102B and the third wireless communication device 102C. In some aspects of operation, wireless signals transmitted on a wireless communication channel (separate from or shared with the wireless communication channel for network traffic) are used to detect movement of an object in a space. The objects can be any type of static or moveable object, and can be living or inanimate. For example, the object can be a human (e.g., the person 106 shown in FIG. 1A), an animal, an inorganic object, or another device, apparatus, or assembly, an object that defines all or part of the boundary of a space (e.g., a wall, door, window, etc.), or another type of object.

FIG. 1B is a diagram showing an example wireless modem 112 coupled to a memory 116 storing modem parameters 120. One or more of the stored modem parameters 120 may represent a radio state of the modem or of the wireless communication device 102C. In some examples, the wireless modem 112 can be implemented as a card, a chip, a chipset, or another type of device. A modem may generally include a radio subsystem and a baseband subsystem, along with software or firmware for one or more wireless communication standards or other protocols. In some cases, a modem includes hardware, software, or firmware (or combinations thereof) to support multiple wireless communication standards (e.g., 3G and LTE).

The example wireless modem 112 shown in FIG. 1B may be operated as described above. For example, the wireless modem 112 may transmit wireless signals on one or more wireless communication channels (e.g., network traffic channels and a dedicated motion detection channel), and may detect motion of object, for example, by processing received signals using the modem parameters 120. In some instances, the example wireless modem 112 may operate in another manner.

The example wireless modem 112 shown in FIG. 1B includes a baseband chip 111, a radio chip 113 and a radio frequency (RF) front end 115. The wireless modem 112 may include additional or different features, and the components may be arranged as shown or in another manner. In some implementations, the baseband chip 111 includes the components and performs the operations of the baseband subsystem described with respect to the example modem 112 shown in FIG. 1A. In some implementations, the baseband chip 111 can process in-phase and quadrature signals (I and Q signals) from the radio chip 113 to extract data from received wireless signals. The baseband chip 111 may control the radio chip 113 or perform other operations. In some cases, the baseband chip 111 can be implemented as a digital signal processor (DSP) or another type of data processing apparatus.

In some implementations, the radio chip 113 and the RF front end 115 include the components and perform the operations of the radio subsystem described with respect to the example modem 112 shown in FIG. 1A. In some implementations, the radio chip 113 can produce in-phase and quadrature signals (I and Q signals), for example, in digital or analog format, based on received wireless signals. In some implementations, the RF front end 115 can include one or more filters, RF switches, couplers, RF gain chips or other components that condition radio frequency signals for transmission or processing.

In some instances, the modem 112 processes received signals that are based on motion probe signals transmitted through a space. These received signals may be referred to as motion detection signals. Processing the received signals may include receiving the motion detection signals at the antenna 117, conditioning (e.g., filtering, amplifying, or down-converting) the motion detection signals at the radio chip 113 or the RF front end 115, and digitally processing the motion detection signals at the baseband chip 111. The modem 112 may utilize one or more modem parameters that indicate one or more settings of the baseband chip 111, the radio chip 113, or the RF front end 115. For instance, the modem parameters may include one or more of a gain setting, an RF filter setting, an RF front end switch setting, a DC offset setting, an IQ compensation setting or another setting for the radio chip 113 or the RF front end 115, or a digital DC correction setting, a digital gain setting, a digital filtering setting or another setting for the baseband chip 111.

In the radio subsystem of the example modem 112 shown in FIG. 1B, the gain setting controls an amount of gain provided at the RF front end 115 to an RF signal received by the antenna 117 (e.g., using an automatic gain control (AGC) loop); the RF filter setting controls a bandwidth filter in the RF front end 115 (e.g., based upon the expected bandwidth of the signal to be received at the antenna 117); the RF front end switch setting controls which RF filters or antenna switches are activated in the RF front end 115 (e.g., to select a particular signal from one of many antennas); the DC offset setting controls an amount of DC signal correction applied in the radio chip 113 (e.g., using a DC offset loop) to a baseband signal; and the IQ compensation setting controls an amount of IQ phase correction applied to signals by the radio chip 113. In the baseband subsystem of the example modem 112 shown in FIG. 1B, the digital DC correction setting controls an amount of DC signal correction applied to a digital signal in the baseband chip 111; the digital gain setting controls an amount of gain applied to a digital signal in the baseband chip 111; and the digital filter setting controls which filter or filters are applied to a digital signal in the baseband chip 111.

In some examples, if a received signal has a relatively weak magnitude, the gain setting may increase an amount of gain applied to the received signal (before processing by the radio chip 113). Conversely, if a received signal has a relatively strong magnitude, the gain setting may decrease an amount of gain applied to the received signal. As another example, if an expected signal has a relatively wide bandwidth of approximately 40 MHz, the RF filter setting may set an RF filter in the RF front end 115 to allow a 40 MHz signal to pass from the antenna 117 to the radio chip 113. As another example, if there is an DC signal (a signal having $\omega=0$ and positive or negative magnitude) present in a down-converted baseband signal, the DC offset setting may allow for a DC correction signal to be applied to the down-converted baseband signal in the radio chip 113 to remove the DC signal. As another example, where in-phase and quadrature signals (I and Q signals) do not have 90 degree phase difference (e.g., a 93 degree difference), an IQ correction signal may be applied to the signals to arrive at the desired 90 degree phase difference.

In some implementations, the modem parameters used to process a first set of motion detection signals may be used (e.g., by being held constant) to process a second set of motion detection signals. By using the same parameters to process the first and second set of motion detection signals, errors (e.g., false positives) in detecting motion may be avoided. For example, by changing the gain setting in the RF front end 115 when processing motion detection signals, an increased magnitude may be determined and motion may be falsely detected. However, in some instances, it may be beneficial to change one or more modem parameters (and thus, the radio state) in order to more efficiently detect motion. Thus, in some implementations, the modem parameters may be controlled such that they are allowed to change, for example, when only interference is detected, but held constant when motion is detected. For example, in some implementations, the modem parameters of a wireless communication device receiving motion detection signals may be controlled according to the process 400 of FIGS. 4A-4C.

Figure 2:
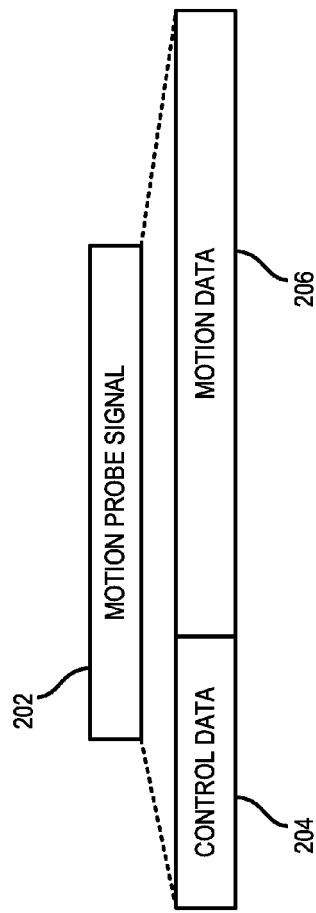
FIG. 2 is a diagram showing an example motion probe signal.

FIG. 2 is a diagram showing an example motion probe signal 202. The example motion probe signal 202 can be transmitted, for example, in a wireless communication system to monitor for motion in a space. In the example shown, the motion probe signal 202 is formatted as a packet with a header and payload. The motion probe signal 202 may be formatted in another manner. In some instances, the motion probe signal 202 is transmitted on a wireless communication channel in a wireless communication network. In some implementations, the motion probe signal 202 can include binary data that is converted to an analog signal, up-converted to radio frequency, and wirelessly transmitted by an antenna.

The example motion probe signal 202 shown in FIG. 2 includes control data 204 and a motion data 206. A motion probe signal 202 may include additional or different features, and may be formatted in another manner. In the example shown, the control data 204 may include the type of control data that would be included in a conventional data packet. For instance, the control data 204 may include a preamble indicating the type of information contained in the motion probe signal 202, an identifier of a wireless communication device transmitting the motion probe signal 202, a MAC address of a wireless communication device transmitting the motion probe signal 202, a transmission power, etc. The motion data 206 is the payload of the example motion probe signal 202. In some implementations, the motion data 206 can be or include, for example, a pseudo-random code or another type of reference signal. In some implementations, the motion data 206 can be or include, for example, a beacon signal broadcast by a wireless network system. The motion data 206 may be known to each of the wireless communication devices in a network.

In an example, the motion probe signal 202 is transmitted by a wireless communication device (e.g., the wireless communication device 102A shown in FIG. 1A) and received at another wireless communication device (e.g., the wireless communication device 102C shown in FIG. 1A). In some cases, the control data 204 changes with each transmission, for example, to indicate the time of transmission or updated parameters. The motion data 206 can remain unchanged in each transmission of the motion probe signal 202. The receiving wireless communication device can process the received signals based on each transmission of the motion probe signal 202, and analyze the motion data in the received signal for changes. For instance, changes in the motion data may indicate movement of an object in a space accessed by the wireless transmission of the motion probe signal 202. The motion data 206 can then be processed, for example, to generate a response to the detected motion.

Figure 3A:
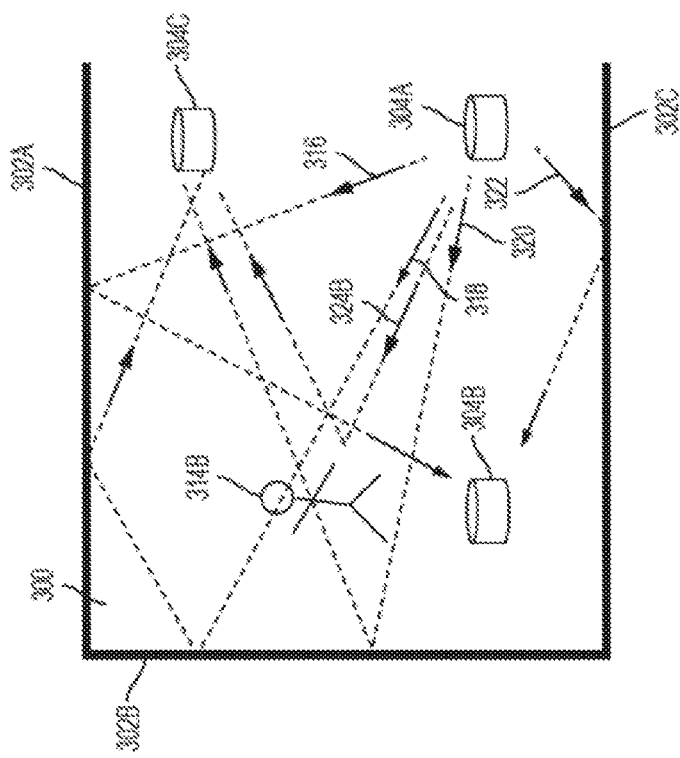
FIGS. 3A and 3B are diagrams showing example signals communicated between wireless communication devices.
Figure 3B:
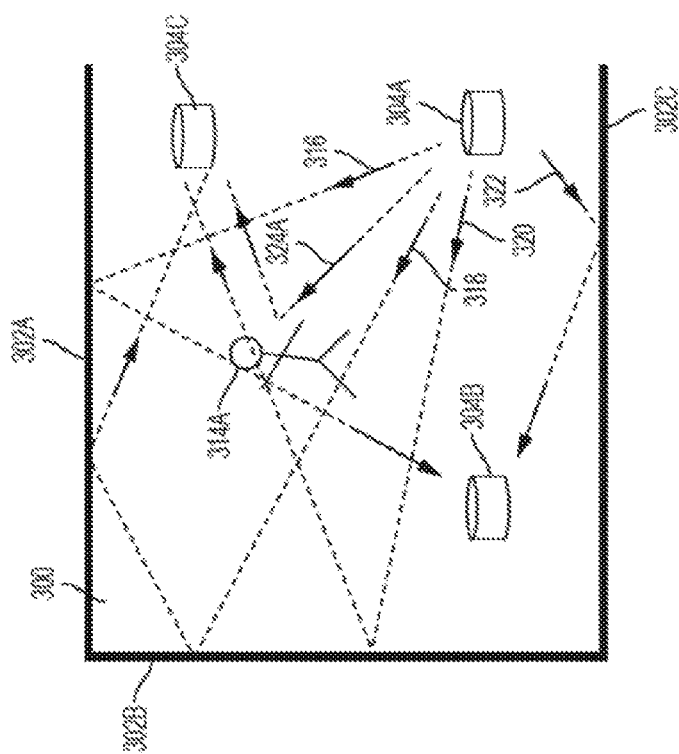

FIGS. 3A and 3B are diagrams showing example wireless signals communicated between wireless communication devices 304A, 304B, 304C. The wireless communication devices 304A, 304B, 304C can be, for example, the wireless communication devices 102A, 102B, 102C shown in FIG. 1A, or other types of wireless communication devices. The example wireless communication devices 304A, 304B, 304C transmit wireless signals through a space 300. The example space 300 can be completely or partially enclosed or open at one or more boundaries of the space 300. The space 300 can be or can include an interior of a room, multiple rooms, a building, an indoor area, outdoor area, or the like. A first wall 302A, a second wall 302B, and a third wall 302C at least partially enclose the space 300 in the example shown.

In the example shown in FIGS. 3A and 3B, the first wireless communication device 304A is operable to transmit wireless signals repeatedly (e.g., periodically, intermittently, at scheduled, unscheduled or random intervals, etc.). The transmitted signals may be formatted like the motion probe signal 202 of FIG. 2, or in another manner. The second and third wireless communication devices 304B, 304C are operable to receive signals based on those transmitted by the wireless communication device 304A. The wireless communication devices 304B, 304C each have a modem (e.g., the modem 112 shown in FIG. 1B) that is configured to process received motion detection signals using stored modem parameters, for example, according to process 400 of FIGS. 4A-4C.

As shown, an object is in a first position 314A in FIG. 3A, and the object has moved to a second position 314B in FIG. 3B. In FIGS. 3A and 3B, the moving object in the space 300 is represented as a human, but the moving object can be another type of object. For example, the moving object can be an animal, an inorganic object (e.g., a system, device, apparatus, or assembly), an object that defines all or part of the boundary of the space 300 (e.g., a wall, door, window, etc.), or another type of object.

As shown in FIGS. 3A and 3B, multiple example paths of the wireless signals transmitted from the first wireless communication device 304A are illustrated by dashed lines. Along a first signal path 316, the wireless signal is transmitted from the first wireless communication device 304A and reflected off the first wall 302A toward the second wireless communication device 304B. Along a second signal path 318, the wireless signal is transmitted from the first wireless communication device 304A and reflected off the second wall 302B and the first wall 302A toward the third wireless communication device 304C. Along a third signal path 320, the wireless signal is transmitted from the first wireless communication device 304A and reflected off the second wall 302B toward the third wireless communication device 304C. Along a fourth signal path 322, the wireless signal is transmitted from the first wireless communication device 304A and reflected off the third wall 302C toward the second wireless communication device 304B.

In FIG. 3A, along a fifth signal path 324A, the wireless signal is transmitted from the first wireless communication device 304A and reflected off the object at the first position 314A toward the third wireless communication device 304C. Between FIGS. 3A and 3B, a surface of the object moves from the first position 314A to a second position 314B in the space 300 (e.g., some distance away from the first position 314A). In FIG. 3B, along a sixth signal path 324B, the wireless signal is transmitted from the first wireless communication device 304A and reflected off the object at the second position 314B toward the third wireless communication device 304C. The sixth signal path 324B depicted in FIG. 3B is longer than the fifth signal path 324A depicted in FIG. 3A due to the movement of the object from the first position 314A to the second position 314B. In some examples, a signal path can be added, removed, or otherwise modified due to movement of an object in a space.

The example wireless signals shown in FIGS. 3A and 3B may experience attenuation, frequency shifts, phase shifts, or other effects through their respective paths and may have portions that propagate in another direction, for example, through the walls 302A, 302B, and 302C. In some examples, the wireless signals are radio frequency (RF) signals. The wireless signals may include other types of signals.

In the example shown in FIGS. 3A and 3B, the first wireless communication device 304A can repeatedly transmit a wireless signal. In particular, FIG. 3A shows the wireless signal being transmitted from the first wireless communication device 304A at a first time, and FIG. 3B shows the same wireless signal being transmitted from the first wireless communication device 304A at a second, later time. The transmitted signal can be transmitted continuously, periodically, at random or intermittent times or the like, or a combination thereof. The transmitted signal can have a number of frequency components in a frequency bandwidth. The transmitted signal can be transmitted from the first wireless communication device 304A in an omni-directional manner, in a directional manner or otherwise. In the example shown, the wireless signals traverse multiple respective paths in the space 300, and the signal along each path may become attenuated due to path losses, scattering, reflection, or the like and may have a phase or frequency offset.

As shown in FIGS. 3A and 3B, the signals from various paths 316, 318, 320, 322, 324A, and 324B combine at the third wireless communication device 304C and the second wireless communication device 304B to form received signals. Because of the effects of the multiple paths in the space 300 on the transmitted signal, the space 300 may be represented as a transfer function (e.g., a filter) in which the transmitted signal is input and the received signal is output. When an object moves in the space 300, the attenuation or phase offset affected upon a signal in a signal path can change, and hence, the transfer function of the space 300 can change. Assuming the same wireless signal is transmitted from the first wireless communication device 304A, if the transfer function of the space 300 changes, the output of that transfer function—the received signal—will also change. A change in the received signal can be used to detect movement of an object.

Mathematically, a transmitted signal f(t) transmitted from the first wireless communication device 304A may be described according to Equation (1):

$$f(t) = \sum_{n=-\infty}^{\infty} c_n e^{j\omega_n t} \tag{1}$$

where $\omega_n$ represents the frequency of $n^{th}$ frequency component of the transmitted signal, $c_n$ represents the complex coefficient of the $n^{th}$ frequency component, and t represents time. With the transmitted signal f(t) being transmitted from the first wireless communication device 304A, an output signal $r_k(t)$ from a path k may be described according to Equation (2):

$$r_k(t) = \sum_{n=-\infty}^{\infty} \alpha_{n,k} c_n e^{j(\omega_n t + \phi_{n,k})} \tag{2}$$

where $\alpha_{n,k}$ represents an attenuation factor (or channel response; e.g., due to scattering, reflection, and path losses) for the $n^{th}$ frequency component along path k, and $\phi_{n,k}$ represents the phase of the signal for $n^{th}$ frequency component along path k. Then, the received signal R at a wireless device can be described as the summation of all output signals $r_k(t)$ from all paths to the wireless device, which is shown in Equation (3):

$$R = \sum_k r_k(t) \tag{3}$$

Substituting Equation (2) into Equation (3) renders the following Equation (4):

$$R = \sum_k \sum_{n=-\infty}^{\infty} (\alpha_{n,k} e^{j\phi_{n,k}}) c_n e^{j\omega_n t} \tag{4}$$

The received signal R at a wireless device can then be analyzed. The received signal R at a wireless device can be transformed to the frequency domain, for example, using a Fast Fourier Transform (FFT) or another type of algorithm. The transformed signal can represent the received signal R as a series of n complex values, one for each of the respective frequency components (at then frequencies $\omega_n$). For a frequency component at frequency $\omega_n$, a complex value $H_n$ may be represented as follows in Equation (5):

$$H_n = \sum_k c_n \alpha_{n,k} e^{j\phi_{n,k}}. \tag{5}$$

The complex value $H_n$ for a given frequency component $\omega_n$ indicates a relative magnitude and phase offset of the received signal at that frequency component $\omega_n$. When an object moves in the space, the complex value $H_n$ changes due to the channel response $\alpha_{n,k}$ of the space changing. Accordingly, a change detected in the channel response can be indicative of movement of an object within the communication channel. In some instances, noise, interference or other phenomena can influence the channel response detected by the receiver, and the motion detection system can reduce or isolate such influences to improve the accuracy and quality of motion detection capabilities. In some implementations, the overall channel response can be represented as:

$$h_{ch} = \sum_{k}\sum_{n=-\infty}^{\infty} \alpha_{n,k}. \qquad (6)$$

In some instances, the channel response $h_{ch}$ for a space can be determined, for example, based on the mathematical theory of estimation. For instance, a reference signal $R_{ef}$ can be modified with candidate channel responses ($h_{ch}$), and then a maximum likelihood approach can be used to select the candidate channel which gives best match to the received signal ($R_{cvd}$). In some cases, an estimated received signal ($\hat{R}_{cvd}$) is obtained from the convolution of the reference signal ($R_{ef}$) with the candidate channel responses ($h_{ch}$), and then the channel coefficients of the channel response ($h_{ch}$) are varied to minimize the squared error of the estimated received signal ($\hat{R}_{cvd}$). This can be mathematically illustrated as:

$$\hat{R}_{cvd} = R_{ef} \otimes h_{ch} = \sum_{k=-m}^{m} R_{ef}(n-k)h_{ch}(k) \qquad (7)$$

with the optimization criterion $$\min_{h_{ch}} \sum (\hat{R}_{cvd} - R_{cvd})^2. \qquad (8)$$

The minimizing, or optimizing, process can utilize an adaptive filtering technique, such as Least Mean Squares (LMS), Recursive Least Squares (RLS), Batch Least Squares (BLS), etc. The channel response can be a Finite Impulse Response (FIR) filter, Infinite Impulse Response (IIR) filter, or the like.

As shown in the equation above, the received signal can be considered as a convolution of the reference signal and the channel response. The convolution operation means that the channel coefficients possess a degree of correlation with each of the delayed replicas of the reference signal. The convolution operation as shown in the equation above, therefore shows that the received signal appears at different delay points, each delayed replica being weighted by the channel coefficient.

In some aspects, a signal quality metric may be determined for received signals based on the channel response. For example, a determined channel response ($h_{ch}$) for a space may be applied to a reference signal ($R_{ef}$) to yield an estimated received signal ($\hat{R}_{cvd}$), which is an estimation of what the received signal should be based on the channel response (e.g., based on convolution of the reference signal ($R_{ef}$) with the channel response ($h_{ch}$) as described above). The estimated received signal ($\hat{R}_{cvd}$) and the actual received signal ($R_{cvd}$) may be used to compute a signal quality metric. In some examples, for instance, a signal quality metric may be based on a value Q that is determined by computing the dot product of the actual received signal ($R_{cvd}$) and the difference between the estimated received signal ($\hat{R}_{cvd}$) and the actual received signal ($R_{cvd}$), e.g.:

$$Q = R_{cvd} \cdot (\hat{R}_{cvd} - R_{cvd}). \qquad (9)$$

Another calculation may be used in some cases to determine a signal quality metric. In some examples, the absolute value or magnitude of the dot product or another computed value is used as a signal quality metric for the received signal. In some cases, the signal quality metric is a correlation index, or another type of signal quality metric. In some cases, the signal quality metric is determined based on a signal-to-noise ratio (SNR) of the received signals.

In some cases, received signals may be "rejected" by a wireless communication device. For example, in some implementations, a motion detection process may include quality criterion for signals. Received signals that do not meet the quality criterion may be rejected (e.g., discarded or ignored) and not considered in determining whether motion has occurred in the space 300. The signals may be accepted or rejected as inputs to the motion detection process based on the signal quality metric (e.g., the value Q described by Equation (9)). For instance, in some cases, motion is detected using only a subset of received signals that have values Q above a certain threshold.

In some implementations, statistical parameters may be determined based on signals received at the wireless communication devices. For example, one or more statistical parameters may be determined based on frequency components of wireless signals received by wireless communication devices (e.g., wireless communication devices 102A, 102B, 102C of FIG. 1A). In some instances, the statistical parameters are based on measurements of a channel response at certain frequencies (e.g., at certain subcarrier frequencies). The statistical parameter may describe a characteristic of the received signals, and may be based on a function applied to frequency components of the received signals over a time segment. In some instances, the statistical parameter includes at least one of the maximum, minimum, mean, or standard deviation of one or more frequency components of the received signals. In some implementations, the statistical parameter is based on a magnitude vector $$\overrightarrow{\Delta_{mag,j}} = (|\overrightarrow{\Delta_{1,j}}|, |\overrightarrow{\Delta_{2,j}}|, |\overrightarrow{\Delta_{3,j}}|, \ldots, |\overrightarrow{\Delta_{n,j}}|) \qquad (10)$$

where $$\overrightarrow{\Delta_j} = \overrightarrow{H_j} - \overrightarrow{H_{j-1}}. \qquad (11)$$

For example, the vector $$\overrightarrow{\Delta_{mag,j}}$$

may be used to determine a mean, such as, for example, according to the mean value function $$\text{mean}_j = \frac{\sum_{i=1}^{n} \Delta_{mag,i,j}}{N}. \qquad (12)$$

As another example, the vector $$\overrightarrow{\Delta_{mag,j}}$$

may be used to determine a standard deviation, such as, for example, according to the standard deviation function:

$$std_j = \sqrt{\frac{\sum_{i=1}^{n}(\Delta_{mag,i,j} - \text{mean})^2}{N-1}} \qquad (13)$$

In some instances, an amount of variation in received signals may be used to control modem parameters. The amount of variation may be based on the statistical parameters described above. For example, the amount of variation may be based on the change in magnitude described by the vector $$\overrightarrow{\Delta_{mag,j}}$$

in Equation (10). As another example, the amount of variation may be based on the standard deviation described by Equation (13) (e.g., the variance, or square of the standard deviation).

Figure 4A:
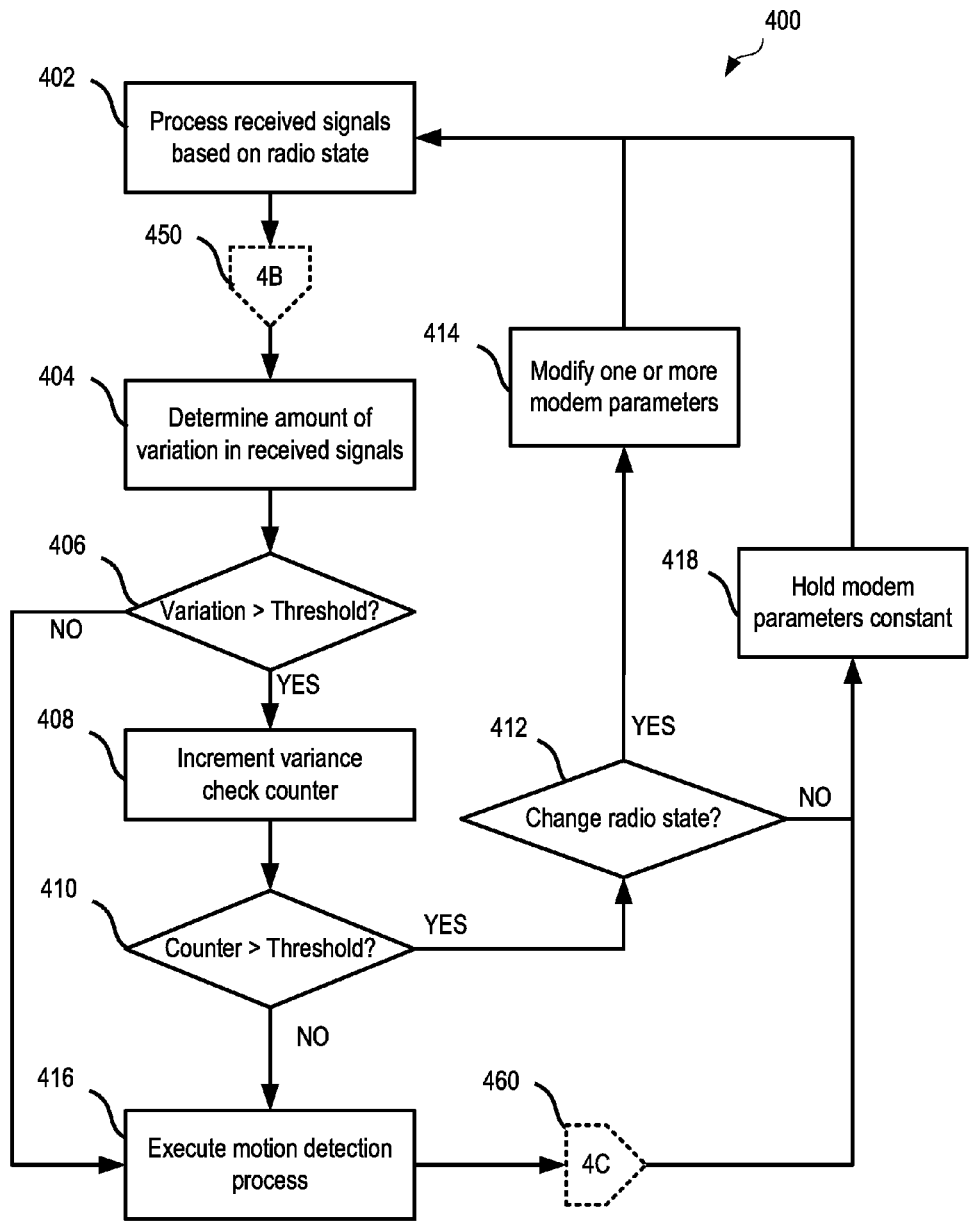
FIGS. 4A-4C are flow diagrams showing an example process for controlling a radio state of a wireless communication device.
Figure 4B:
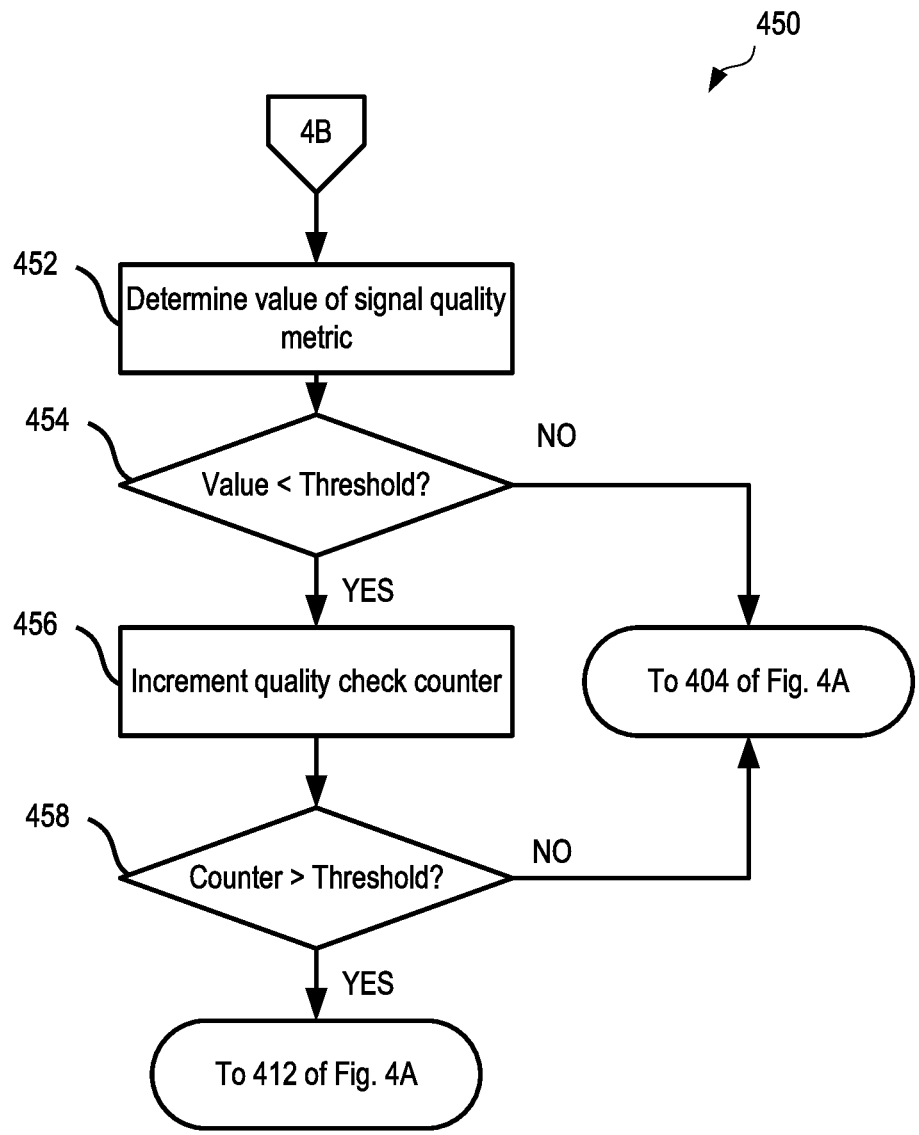
Figure 4C:
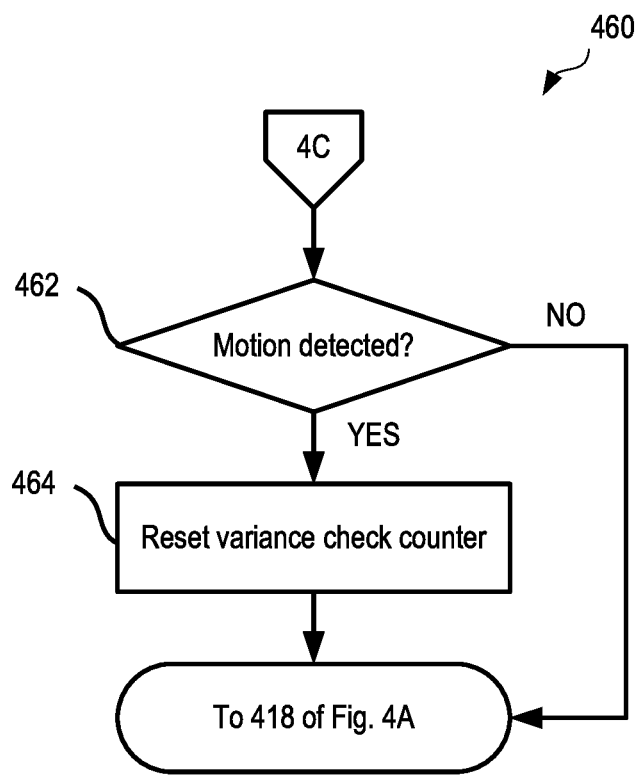

FIGS. 4A-4C are flow diagrams showing an example process 400 for controlling a radio state of a wireless communication device. In some instances, the process 400 may be implemented by the wireless communication device to detect motion of an object in a space. For example, one or more aspects of the process 400 may be implemented to control the radio state of the wireless communication device while the wireless communication device receives and processes signals based on motion probe signals to detect motion of an object in a space.

Operations in the example process 400 may be performed by a data processing apparatus (e.g., the processor 114 of the example wireless communication device 102C in FIG. 1A) to detect motion based on signals received at wireless communication devices (e.g., wireless communication device 102C of FIG. 1A). The example process 400 may be performed by another type of device. For instance, operations of the process 400 may be performed by a system other than the wireless communication device 102C that receives the signals (e.g., a computer system connected to the wireless communication system 100 of FIG. 1A that aggregates and analyzes signals received by the wireless communication device 102C).

The example process 400 may include additional or different operations, and the operations may be performed in the order shown or in another order. In some cases, one or more of the operations shown in FIGS. 4A-4C are implemented as processes that include multiple operations, sub-processes or other types of routines. In some cases, operations can be combined, performed in another order, performed in parallel, iterated, or otherwise repeated or performed another manner.

At 402, signals received at a wireless communication device are processed by operation of a radio subsystem of a wireless communication device in a first radio state. For instance, the signals may be processed using one or more modem parameters (e.g., a gain or filter setting) of the wireless communication device. The received signals may be based on wireless signals transmitted through a space by a transmitting wireless communication device. In some implementations, a magnitude of the motion detection signal may be recorded. For example, in some instances, when the motion detection signal is received and processed, a power of the received signal is measured and stored in a database. The database may store power or other measurements for signals received by the wireless communication device (or other wireless communication devices) over a period of time.

At 404, an amount of variation in the received signals is determined. The amount of variation may be based on values of a parameter of the signals received at 402, which may include signals transmitted at different times over a time period. For example, the amount of variation may be based on a magnitude (e.g., power level) of a received signal. In some instances, the amount of variation is based on a comparison of information associated with received signals stored in the database. The database may include information associated with all signals received over a period of time, or a subset of signals received over the period of time (e.g., only those that are accepted as inputs to a motion detection process). In some instances, the amount of variation may be determined based on the vector of Equation (10) above. In some instances, the amount of variation is based on a statistical parameter. For example, the amount of variation may be based on the standard deviation described above in Equation (13) (e.g., the square of the standard deviation).

At 406, it is determined whether the amount of variation computed at 404 is greater than a first threshold. If the amount of variation is above the first threshold, then a variance check counter is incremented at 408. It is then determined at 410 whether the variance check counter exceeds a second threshold. If the variance check counter exceeds the second threshold, then it may be determined that the changes seen in the received signals are based on interference rather than motion in the space. The wireless communication device then determines at 412 whether to change its radio state. For example, the wireless communication device may execute a gain state machine (e.g., an AGC loop) to determine whether a gain setting should be adjusted. If it is determined that a radio state change should be made, then the radio state change is made by modifying one or more modem parameters of the wireless communication device at 414. If, however, it is determined that a radio state change should not be made, then the modem parameters are held constant at 418.

In some instances, the determination of whether a radio state change should be made is based on an analysis of signals received over a longer time period than the time period used for determining an amount of variance. By using a longer time period in the analysis of radio state change versus variance determination, the impact of interference can be reduced or minimized when determining whether a radio state should change. For example, interference seen in more recently received signals may be fleeting when looked at in the context of signals received over a much longer time period. Thus, although interference may be detected and a gain state machine may be executed in response, a radio state change might not be made by the gain state machine.

If the counter does not exceed the threshold at 410, then a motion detection process is executed at 416 to determine whether motion has occurred in the space. The motion detection process may include a comparison of signals received over a particular period of time. For example, motion may be detected based on a detected change in the frequency response of the signals received at 402, or based upon a detected change in the channel response for the space. In some implementations, in response to detecting motion, an action or programmed response may be taken. For example, a computing device (e.g., the wireless communication device 102C of FIG. 1A or another device) may activate a security alert (e.g., send an alert to security personnel, to a homeowners' mobile phone, or to another device), activate lighting or HVAC in the location where motion was detected (e.g., in a room, a hallway, or outdoors), or perform a combination of these or other types of programmed responses.

FIG. 4B illustrates a sub-process 450 of the process 400 shown in FIG. 4A. The sub-process 450 illustrates an example process for determining whether to allow for radio state changes based on a signal quality metric. For example, a radio state change may be called for if values of a signal quality metric continue to be low, even though the amount of variation in the received signals also is low (which may not otherwise trigger the determination at 412). The sub-process 450 may be implemented in process 400, or may be excluded from process 400.

When a signal is received at 402, a value of a signal quality metric is determined for the signal at 452. The signal quality metric value may be determined as described above. For example, the value may be based on or equal to the value Q described by Equation (9) above. The value of the signal quality metric is then compared with a threshold at 454. The threshold may be based on a quality criterion for the motion detection process of 416. If the value of the signal quality metric is above the threshold, then the received signal may be deemed acceptable as an input to the motion detection process of 416 ("accepted"). If this is the case, then the sub-process 450 returns to 404 of the process 400. However, if the value of the signal quality metric is below the threshold, then the signal may be deemed unacceptable as an input to the motion detection process of 416, and it may be discarded or otherwise not considered ("rejected"). In this case, a quality check counter may be incremented at 456. It is then determined at 458 whether the quality check counter exceeds a certain threshold value. If the counter does exceed the threshold, then the sub-process 450 returns to 412 of the process 400 in FIG. 4A, where the wireless communication device may determine whether to change the radio state as described above (e.g., the gain state machine is executed). If the counter does not exceed the threshold at 458, then the sub-process 450 returns to 404 of the process 400 in FIG. 4A.

FIG. 4C illustrates a sub-process 460 of the process 400 shown in FIG. 4A. The sub-process 460 illustrates an example process for implementing a "motion hold" control in the process 400 of FIG. 4A. The sub-process 460 may be implemented in process 400, or may be excluded from process 400. In the example sub-process 460, if motion is being detected by the motion detection process of 416, the wireless communication device can prohibit radio state changes in some cases. Accordingly, in response to the detection of motion at 462, the variance check counter is reset to a default value (e.g., zero) at 464 in order to delay or prevent the determination at 412 from taking place. If, however, motion is not detected by the motion detection process of 416, then 464 is bypassed. The sub-process 460 then returns to 418 of the process 400, where the modem parameters of the wireless communication device are held constant for the next received signal.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer-readable storage medium for execution by, or to control the operation of, data-processing apparatus. A computer-readable storage medium can be, or can be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially generated propagated signal. The non-transitory computer-readable storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., non-magnetic drives (e.g., a solid-state drive), magnetic disks, magneto optical disks, or optical disks. However, a computer need not have such devices. Moreover, a computer can be embedded in another device, e.g., a phone, a tablet computer, an electronic appliance, a mobile audio or video player, a game console, a Global Positioning System (GPS) receiver, an Internet-of-Things (IoT) device, a machine-to-machine (M2M) sensor or actuator, or a portable storage device (e.g., a universal serial bus (USB) flash drive). Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a stylus, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computing devices that operate in proximity or generally remote from each other and typically interact through a communication network. The communication network may include one or more of a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

In a general aspect of the examples described, the radio state of a wireless communication device is controlled.

In a first example, a first set of motion detection signals is processed by operation of a radio subsystem of a wireless communication device in a first radio state. The motion detection signals based on wireless signals transmitted through a space. An amount of variation in the first set of motion detection signals is determined, by operation of one or more processors, based on values of a parameter of the respective motion detection signals. A value of a counter is updated in response to a determination that the amount of variation is greater than a first threshold, and the radio subsystem is changed from the first radio state to a second radio state based on a comparison of the value of the counter and a second threshold (e.g., the counter is greater than a threshold value). A motion detection process is executed to detect motion of an object in the space based on a second set of motion detection signals processed by operation of the radio subsystem in the second radio state.

Implementations of the first example may, in some cases, include one or more of the following features. Changing the radio subsystem from the first radio state to the second radio state may include executing a gain state machine. Executing the gain state machine may include using an automatic gain control (AGC) loop. The motion detection process may detect motion of an object based on a subset of the second set of motion detection signals. The counter may be set to a default value (e.g., zero) in response to detecting motion based on the second set of motion detection signals. Determining the amount of variation may include computing a variance of in the respective motion detection signals in the first set. The parameter may include a power level of the respective motion detection signals. Modem parameters may be held constant based on the comparison of the value of the counter and a second threshold (e.g., the counter is less than the second threshold).

Implementations of the first example may, in some cases, include one or more of the following features. Values of a signal quality metric may be computed, by operation of one or more processors, based on the respective motion detection signals in the first set, and the values of the parameter may be stored in a database based on a determination that the values of the signal quality metric meet a quality criterion for the motion detection process. The amount of variation may be determined based on the values of the parameter stored in the database. The counter may include a first counter, values of a signal quality metric may be computed, by operation of one or more processors, based on the respective motion detection signals in the second set, a value of a second counter may be updated in response to a determination that the values of the signal quality metric do not meet a quality criterion for the motion detection process, and the radio subsystem may be changed from the second radio state to a third radio state based on a comparison of the value of the second counter and a third threshold (e.g., the second counter is greater than the third threshold). Changing the radio subsystem from the first radio state to the second radio state may include modifying one or more modem parameters including a gain setting, an RF filter setting, an RF front end switch setting, a DC offset setting, an IQ compensation setting, digital DC correction setting, a digital gain setting, or a digital filtering setting.

In some implementations, a computer-readable storage medium stores instructions that are operable when executed by a data processing apparatus to perform one or more operations of the first example. In some implementations, a wireless communication device includes a data processing apparatus and a computer-readable storage medium storing instructions that are operable when executed by the data processing apparatus to perform one or more operations of the first example.

In a second example, a wireless communication device includes a processor, a modem comprising a radio subsystem that is configured to receive motion detection signals and process the motion detection signals while operating in a radio state of the radio subsystem, and a memory storing instructions. The instructions are operable when executed by the processor to determine an amount of variation in the motion detection signals based on values of a parameter of the respective motion detection signals, update a value of a counter in response to a determination that the amount of variation is greater than a first threshold, and change the radio state of the radio subsystem based on a comparison of the value of the counter and a second threshold (e.g., the counter is greater than the second threshold). The instructions are also operable to execute a motion detection process to detect motion of an object in a space based on motion detection signals processed by the radio subsystem in the changed radio state.

Implementations of the second example may, in some cases, include one or more of the following features. The instructions may be operable to modify the radio state of the radio subsystem by executing a gain state machine. The gain state machine may include an automatic gain control (AGC) loop. The instructions may be operable to reset the counter to a default value in response to detecting motion based on the motion detection signals. The instructions may be operable to hold the radio state constant based on the comparison of the value of the counter and a second threshold (e.g., the counter is less than the second threshold). The instructions may be operable to compute values of a signal quality metric based on the respective motion detection signals in the first set, store the values of the parameter in a database based on a determination that the values of the signal quality metric meet a quality criterion for the motion detection process, and determine the amount of variation based on the values of the parameter stored in the database. The counter may include a first counter, and the instructions may be operable to compute values of a signal quality metric based on the motion detection signals processed by the radio subsystem in the changed radio state, update a value of a second counter in response to a determination that the values of the signal quality metric do not meet a quality criterion for the motion detection process, and change the radio state of the radio subsystem based on a comparison of the value of the second counter and a third threshold (e.g., the second counter is greater than the third threshold). The instructions may be operable to change the radio state of the radio subsystem are operable to modify one or more modem parameters including a gain setting, an RF filter setting, an RF front end switch setting, a DC offset setting, an IQ compensation setting, digital DC correction setting, a digital gain setting, or a digital filtering setting.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

A number of embodiments have been described. Nevertheless, it will be understood that various modifications can be made. Accordingly, other embodiments are within the scope of the following claims.

What is claimed is:

1. A motion detection method comprising:
    processing a first set of motion detection signals by operation of a radio subsystem of a wireless communication device in a first radio state, the motion detection signals based on wireless signals transmitted through a space;
    by operation of one or more processors, determining an amount of variation in the first set of motion detection signals based on values of a parameter of the respective motion detection signals;
    updating a value of a counter in response to a determination that the amount of variation is greater than a first threshold;
    changing the radio subsystem from the first radio state to a second radio state based on a comparison of the value of the counter and a second threshold; and
    executing a motion detection process to detect motion of an object in the space based on a second set of motion detection signals processed by operation of the radio subsystem in the second radio state.

2. The method of claim 1, wherein changing the radio subsystem from the first radio state to the second radio state comprises executing a gain state machine.

3. The method of claim 2, wherein executing a gain state machine comprises using an automatic gain control (AGC) loop.

4. The method of claim 1, wherein the motion detection process detects motion of an object in the space based on a subset of the second set of motion detection signals.

5. The method of claim 1, comprising setting the counter to a default value in response to detecting motion based on the second set of motion detection signals.

6. The method of claim 1, wherein determining the amount of variation comprises computing a variance of the parameter of the respective motion detection signals in the first set.

7. The method of claim 1, wherein the parameter comprises a power level of the respective motion detection signals.

8. The method of claim 1, comprising holding modem parameters constant based on the comparison of the value of the counter and a second threshold.

9. The method of claim 1, comprising:
    by operation of one or more processors, computing values of a signal quality metric based on the respective motion detection signals in the first set; and
    storing the values of the parameter in a database based on a determination that the values of the signal quality metric meet a quality criterion for the motion detection process;
    wherein the amount of variation is determined based on the values of the parameter stored in the database.

10. The method of claim 1, wherein the counter comprises a first counter, and the method comprises:
    by operation of one or more processors, computing values of a signal quality metric based on the respective motion detection signals in the second set;
    updating a value of a second counter in response to a determination that the values of the signal quality metric do not meet a quality criterion for the motion detection process; and
    changing the radio subsystem from the second radio state to a third radio state based on a comparison of the value of the second counter and a third threshold.

11. The method of claim 1, wherein changing the radio subsystem from the first radio state to the second radio state comprises modifying one or more modem parameters including a gain setting, an RF filter setting, an RF front end switch setting, a DC offset setting, an IQ compensation setting, digital DC correction setting, a digital gain setting, or a digital filtering setting.

12. A non-transitory computer-readable storage medium storing instructions that are operable when executed by a data processing apparatus to perform operations comprising:
processing a first set of motion detection signals by operation of a radio subsystem of a wireless communication device in a first radio state, the motion detection signals based on wireless signals transmitted through a space;
determining an amount of variation in the first set of motion detection signals based on values of a parameter of the respective motion detection signals;
updating a value of a counter in response to a determination that the amount of variation is greater than a first threshold;
changing the radio subsystem from the first radio state to a second radio state based on a comparison of the value of the counter and a second threshold; and
executing a motion detection process to detect motion of an object in the space based on a second set of motion detection signals processed by operation of the radio subsystem in the second radio state.

13. The non-transitory computer-readable medium of claim 12, wherein changing the radio subsystem from the first radio state to the second radio state comprises executing a gain state machine.

14. The non-transitory computer-readable medium of claim 13, wherein executing a gain state machine comprises using an automatic gain control (AGC) loop.

15. The non-transitory computer-readable medium of claim 12, wherein the motion detection process detects motion of an object in the space based on a subset of the second set of motion detection signals.

16. The non-transitory computer-readable medium of claim 12, wherein the operations comprise setting the counter to a default value in response to detecting motion based on the second set of motion detection signals.

17. The non-transitory computer-readable medium of claim 12, wherein determining the amount of variation comprises computing a variance of in the parameter of the respective motion detection signals in the first set.

18. The non-transitory computer-readable medium of claim 12, wherein the parameter comprises a power level of the respective motion detection signals.

19. The non-transitory computer-readable medium of claim 12, wherein the operations comprise holding modem parameters constant based on the comparison of the value of the counter and a second threshold.

20. The non-transitory computer-readable medium of claim 12, wherein the operations comprise:
computing values of a signal quality metric based on the respective motion detection signals in the first set; and
storing the values of the parameter in a database based on a determination that the values of the signal quality metric meet a quality criterion for the motion detection process;
wherein the amount of variation is determined based on the values of the parameter stored in the database.

21. The non-transitory computer-readable medium of claim 12, wherein the counter comprises a first counter, and the operations comprise:
computing values of a signal quality metric based on the respective motion detection signals in the second set;
updating a value of a second counter in response to a determination that the values of the signal quality metric do not meet a quality criterion for the motion detection process; and
changing the radio subsystem from the second radio state to a third radio state based on a comparison of the value of the second counter and a third threshold.

22. The non-transitory computer-readable medium of claim 12, wherein changing the radio subsystem from the first radio state to the second radio state comprises modifying one or more modem parameters including a gain setting, an RF filter setting, an RF front end switch setting, a DC offset setting, an IQ compensation setting, digital DC correction setting, a digital gain setting, or a digital filtering setting.

23. A wireless communication device comprising:
a processor;
a modem comprising a radio subsystem that is configured to receive motion detection signals and process the motion detection signals while operating in a radio state of the radio subsystem; and
a memory storing instructions that are operable when executed by the processor to:
determine an amount of variation in the motion detection signals based on values of a parameter of the respective motion detection signals;
update a value of a counter in response to a determination that the variation is greater than a first threshold; and
change the radio state of the radio subsystem based on a comparison of the value of the counter and a second threshold; and
execute a motion detection process to detect motion of an object in a space based on motion detection signals processed by the radio subsystem in the changed radio state.

24. The wireless communication device of claim 22, wherein the instructions are operable to modify the radio state of the radio subsystem by executing a gain state machine.

25. The wireless communication device of claim 24, the gain state machine comprises an automatic gain control (AGC) loop.

26. The wireless communication device of claim 22, wherein the instructions are operable to reset the counter to a default value in response to detecting motion based on the motion detection signals.

27. The wireless communication device of claim 22, wherein the instructions are operable to hold the radio state constant based on the comparison of the value of the counter and a second threshold.

28. The wireless communication device of claim 22, wherein the instructions are operable to:
compute values of a signal quality metric based on the respective motion detection signals; and
store the values of the parameter in a database based on a determination that the values of the signal quality metric meet a quality criterion for the motion detection process; and
determine the amount of variation based on the values of the parameter stored in the database.

29. The wireless communication device of claim 22, wherein the counter comprises a first counter, and the instructions are operable to:
compute values of a signal quality metric based on the motion detection signals processed by the radio subsystem in the changed radio state;

update a value of a second counter in response to a determination that the values of the signal quality metric do not meet a quality criterion for the motion detection process; and change the radio state of the radio subsystem based on a comparison of the value of the second counter and a third threshold.

30. The wireless communication device of claim 22, wherein the instructions operable to change the radio state of the radio subsystem are operable to modify one or more modem parameters including a gain setting, an RF filter setting, an RF front end switch setting, a DC offset setting, an IQ compensation setting, digital DC correction setting, a digital gain setting, or a digital filtering setting.

* * * * *